No Printed Specification Available
7215X
Strong & Moody.
Hulling Mach.
Patented Aug. 29, 1832.
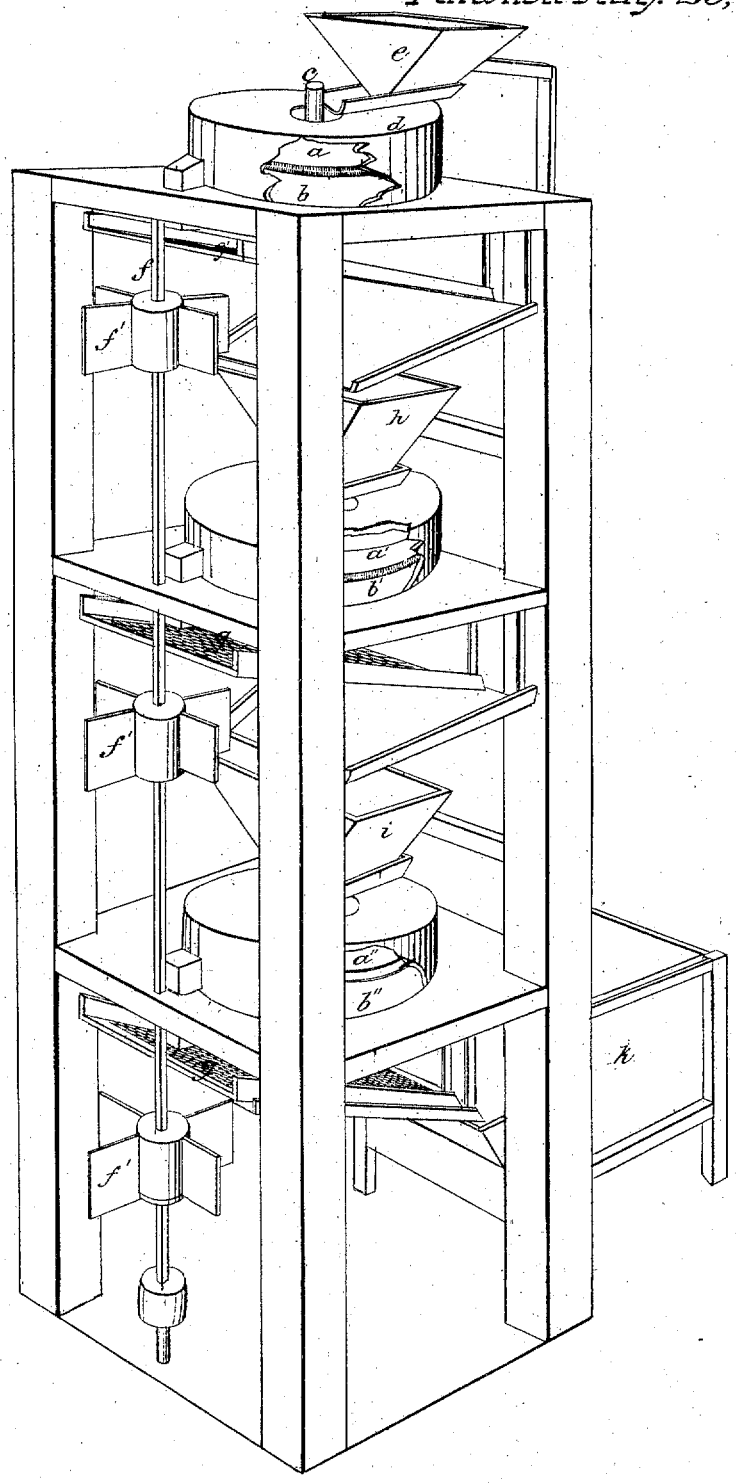

7215X Aug. 29. 1832 71

Theodore F. Strong & Marcus T. Moody
Letters Patent

The schedule referred to in these Letters Patent and making part of the same containing a description in the words of the said Theodore F Strong & Marcus T. Moody themselves of their improvement in the Machine for hulling cleaning & polishing Barley Rice &c called "Strong & Moody's huller Smutter & polisher"—

To all persons to whom these presents shall come Theodore F Strong House Carpenter & Joiner & Marcus T. Moody Cabinet maker both of Northampton in the County of Hampshire and Commonwealth of Massachusetts send greeting. Be it known that we the said Theodore F. Strong & Marcus T. Moody have jointly invented constructed made and applied to use a new and useful improvement in the mode of hulling Cleansing & polishing of Barley Rice Broom-corn & other small seeds, having a hard kernel & difficult to separate from the hull or husk called Strong & Moody's huller smutter & polisher specified in the words following to wit. This improvement consists of two flat or short cylinders of any required diameter placed in a perpendicular shaft similar to the stones in a grist mill. The upper cylinder is made of cast iron having a sheathing on the under side made of wood. The under cylinder is made of wood & is firmly affixed to a platform The under side of the upper cylinder and the upper side of the lower one are to be studded clothed or charged with strong card teeth, pins or points of metallic wire set in leather or any other strong & elastic substance. The upper cylinder is moved by an upright shaft to which it is affixed, while the lower one is supported on a platform connected with the quadrangular frame which supports Drawing with hulling machinery 12 7215x Aug 29, 1832 supports the machinery. A rim or border of metal or wood is placed on the outer edge of the lower cylinder having an opening on one side thro' which the seeds pass after having been run thro' the cylinders. From the opening in the rim aforesaid the seeds are carried by a trough to a winnower & screen affixed to a small upright shaft within the quadrangular frame & after being winnowed & passed thro the screen the seeds are carried by a trough into another pair of cylinders made precisely like the first mentioned pair excepting the materials which are used for clothing studding or charging which are to be of a finer quality than the pair first mentioned. From this second pair of cylinders the seeds are to be passed thro' a winnower & screen similar to those first above mentioned. When it is desired to give a better polish to the seeds than is produced by passing it thro' the two pairs of cylinders above mentioned another pair of cylinders are to be added made precisely like those above mentioned except the clothing charging or studding which is to be made of dogfish skin or of strong bristles or hair. The seeds are to be passed from thence into a winnower & from thence into a bolt covered with screen wire. Method of Operation. The seed to be cleaned hulled or polished is to be placed in a hopper leading into the first pair of cylinders from thence it passes into the first mentioned winnower & screen from thence into the second pair of cylinders from thence into the second winnower & screen from thence into the third pair of cylinders, from thence into the last mentioned winnower & from thence into the bolt. The said Moody & Strong claim as their joint invention in the improvement herein specified & described, the method of hulling cleaning polishing & burnishing of Barley Rice Broom corn seed & other small seeds having a hard kernel and appertaining difficult to separate from the hull or husks, by means of a
combination of flat cylinders in a perpendicular shaft clothed,
charged or studded with card teeth pins or points of metal-
lic wire set in strong leather or any other strong elastic sub-
stance, & also for flat cylinders clothed charged or studded with
bristles hair or dog fish skin for burnishers of brushes herein
specified and described. In testimony that the above
is a true specification of our said improvement as above
described We have hereunto set our hands at North
ampton aforesaid. this thirtieth day of July in the
year of our Lord one thousand eight hundred and
thirty two Witnesses
Israel H. Dickinson
Rufus C. Rowley Theodore F. Strong
Marcus T. Moody Exd W.H.

800 w [illegible]